United States Patent [19]
Bae et al.

[11] Patent Number: 5,551,663
[45] Date of Patent: Sep. 3, 1996

[54] PLASTIC MOLDS FOR OPHTHALMIC DEVICES AND METHODS FOR FORMING SAME

[75] Inventors: Young C. Bae, Seoul, Rep. of Korea; Fredric J. Lim, Fremont; Thomas B. Ottoboni, Belmont; David S. Soane, Piedmont, all of Calif.

[73] Assignee: Soane Technologies, Inc., Hayward, Calif.

[21] Appl. No.: 309,998

[22] Filed: Sep. 20, 1994

[51] Int. Cl.$^6$ ............................................. B29C 33/62
[52] U.S. Cl. ..................... 249/115; 427/133; 427/508; 427/515
[58] Field of Search ................ 249/114.1, 115, 249/134; 427/133, 508, 512, 515

[56] References Cited

U.S. PATENT DOCUMENTS

| | | | |
|---|---|---|---|
| 3,806,079 | 4/1974 | Beattie | 249/134 |
| 3,830,460 | 8/1974 | Beattie | 249/134 |
| 3,968,305 | 7/1976 | Oshima et al. | 428/334 |
| 3,968,309 | 7/1976 | Matsuo et al. | 428/409 |
| 4,199,421 | 4/1980 | Kamada et al. | 427/420 |
| 4,338,269 | 7/1982 | Russell | 264/338 |
| 4,544,572 | 10/1985 | Sandvig et al. | 427/133 |
| 4,571,314 | 2/1986 | Suzuki et al. | 264/2.5 |
| 4,719,146 | 1/1988 | Hohage et al. | 428/331 |
| 4,756,972 | 7/1988 | Kloosterboer et al. | 264/1.7 |
| 4,758,448 | 7/1988 | Sandvig et al. | 427/54.1 |
| 4,774,035 | 9/1988 | Carmelite et al. | 264/1.4 |
| 4,785,064 | 11/1988 | Hegel | 526/261 |
| 4,921,205 | 5/1990 | Drew, Jr. et al. | 249/134 |
| 4,954,591 | 9/1990 | Belmares | 526/264 |
| 4,987,230 | 1/1991 | Monroe | 546/94 |
| 5,049,321 | 9/1991 | Galic | 264/1.4 |
| 5,110,514 | 5/1992 | Soane | 264/1.3 |
| 5,114,632 | 5/1992 | Soane | 264/1.3 |
| 5,141,678 | 8/1992 | Blum | 264/1.7 |
| 5,160,668 | 11/1992 | Imus | 264/2.5 |
| 5,246,728 | 9/1993 | Rodriguez | 427/164 |
| 5,278,243 | 1/1994 | Soane | 525/288 |

OTHER PUBLICATIONS

"Radiation–Curable Coatings on Glass and Plastics", *Modern Coating Technology*, pp. 103–117. (No date).

*Primary Examiner*—Robert Davis
*Attorney, Agent, or Firm*—Fish & Richardson P.C.

[57] ABSTRACT

Plastic molds for ophthalmic devices and methods of making such molds are disclosed. The plastic molds are provided with abrasion resistant, release-enhancing faces formed by coatings of particular compositions of polyacryloylated alkane polyols and alkane polyols.

6 Claims, No Drawings

PLASTIC MOLDS FOR OPHTHALMIC DEVICES AND METHODS FOR FORMING SAME

FIELD OF THE INVENTION

This invention relates to ophthalmic devices and, in particular, plastic molds for preparing ophthalmic devices by a casting process.

BACKGROUND OF THE INVENTION

During casting of liquid resins for ophthalmic or specialty optics applications, the resin is introduced into a cavity formed by two mold pieces and polymerized into a solid object. The final object replicates the shape of the mold faces. Traditional molds that are employed for thermal or radiation polymerization of liquid resins are made of either glass or metals. These materials are chosen since they are usually inert to most liquid resins, non-porous, durable, and have high thermomechanical stability, thereby allowing a large number of castings to be made before replacement is necessary.

One major problem with the use of glass or metal molds is their cost. Each mold piece requires individual machining and/or polishing which is relatively expensive. Even when slumping is used to produce acceptable glass molds, their production cost remains high. Although, metal or glass molds are durable under normal operating conditions, they may be easily damaged if mishandled. Chipping, cracking, and scratching of the mold face are simple manifestations of mishandled molds. It is therefore extremely desirable to develop molds that may be mass manufactured inexpensively.

An inexpensive alternative to glass or metal is plastic molds. However, plastic suffers from several disadvantages compared with glass or metal. For example, certain liquid resins may soften, etch and/or react with the plastic mold material rendering the mold unsuitable for preparing optical devices. Also, plastic is not as durable particularly with respect to scratching, and has much poorer thermomechanical stability than glass or metal. Plastic also has a higher thermal expansion coefficient over glass or metal, which may cause deformation of the mold face particularly if the curing temperatures are high. However, since plastic items can be produced very inexpensively using traditional processes such as injection molding, the use of plastic molds may be viable for certain applications.

Accordingly, it is an object of the present invention to provide a plastic mold for casting of ophthalmic or specialty lenses, or other optical objects.

It is a further object of the present invention to provide plastic ophthalmic molds coated with a formulation that is durable, adheres strongly to plastic substrate during the curing process, but provides release capability.

It is another object of the present invention to provide a method of making a plastic mold for casting of ophthalmic or specialty lenses, or other optical objects.

SUMMARY OF THE INVENTION

The present invention provides a plastic mold for casting ophthalmic devices comprising one or more plastic pieces defining a shape of the object to be molded.

The invention further provides a plastic mold having an adherent, abrasion resistant, release-enhancing face. A preferred mold is formed by curing a composition comprising:

ten to fifty parts of polyacryloylated alkane polyols, said alkane polyols containing up to about twenty carbon atoms and an average of at least three O-acryloyl groups; and twenty to eighty parts of alkane polyols, said alkane polyols containing up to about twenty carbon atoms and an average of at least three O- [acryloyl-(polyalkylene oxide)] chains; wherein each of said polyalkylene oxide chains comprise from one to twenty alkylene oxide groups.

All parts described herein are by weight. Molds are cured by thermal treatment and/or radiation.

Another preferred plastic mold according to the invention has an adherent, abrasion resistant, release-enhancing face, formed by curing a composition comprising:

twenty to forty parts of polyacryloylated alkane polyols, said alkane polyols containing up to about twenty carbon atoms and an average of at least three O-acryloyl groups;

fifty to eighty parts of alkane polyols, said alkane polyols containing up to about twenty carbon atoms and an average of at least three O-[acryloyl(polyalkylene oxide)] chains; wherein each of said polyalkylene oxide chains comprise from one to twenty alkylene oxide groups; and optionally, five to thirty parts of an acrylated material which promotes adhesion of the cured coating composition to said substrate.

Also provided is a plastic mold with either of the above coatings, further comprising:

one tenth to twenty parts of surfactant agent to enhance formation of a uniform coating surface, such as silicone acrylate, silicone, fluoroester, hydrocarbon, fluoroether, or silicone ether.

The present invention additionally provides a method of making such molds, comprising the steps of:

providing a mold having casting faces comprising acrylate or methacrylate;

coating the casting faces of the mold with one of the adherent, abrasion resistant, release-enhancing, radiation or thermally curable compositions described above, with the addition of a photoinitiating amount of a photoinitiator; and exposing the coating to ultraviolet radiation sufficient to activate the photoinitiator and polymerize the composition.

DETAILED DESCRIPTION OF THE INVENTION

The present invention provide plastic mold pieces which are used instead of glass.

The materials for plastic molds to be useful in thermal or radiation curing of lenses or other ophthalmic material must transmit the curing radiation. For example, polystyrene or polycarbonate, which have strong aromatic character do not transmit ultraviolet (UV) light. For UV curing of liquid resins, acrylic and methacrylic materials are preferred. For example, pure polymethylmethacrylate (PMMA) at ⅛" thickness has UV transmission greater than 80% for long wave radiation (greater than 300 nanometers (nm)), but other grades may be formulated to absorb short wave UV radiation to prevent premature breakdown of the plastic material. Some examples of available UV transmissive PMMA are the OP1 and OP4 products by Cyro Industries and UV-T by Rohm and Haas. PMMA, which has a glass transition temperature (Tg) of approximately 100° C. can tolerate modest excursions from room temperature during liquid resin curing. For plastic molds, a preferred grade of PMMA with high heat deflection temperature is V8-25 from Rohm & Haas or CP-75 from ICI. In addition, imidized versions of PMMA which have excellent heat stability may also be employed, such as the KAMAX grades from Rohm & Haas and the Perspex HHA grades from ICI.

Other types of radiation transmissive plastics which may be used according to the invention include aliphatic polyesters, polyamides, polyurethanes, amorphous poly olefins, polycarbonates, polyimides and co-polymers thereof.

Injection molding of PMMA or acrylics into lens shaped articles using glass, ceramic or metal molds is a known practice in industry, however plastics have not previously been used as materials for ophthalmic molds. The present invention adapts the plastic materials and methods cited above to the fabrication of molds for ophthalmic devices.

Molds composed preferably of acrylic and methacrylic materials are useful to form lenses or other ophthalmic devices in some casting applications. However, one disadvantage of acrylic materials is that they are not inert to many organic casting liquids which can partially dissolve the molds. Also, the perfect or near perfect adherence of the finished lenses to the molds, may make their separation difficult if the mold is not sufficiently inert to the materials used in the casting process.

Accordingly, another aspect of this invention addresses this problem by providing a coating inert to the liquid resin for the casting faces of mold pieces comprising a suitable material that protects the mold and also facilities release of the lens or part after the completion of the polymerization. The coating preferably will be chemically inert to the mold and resin used to form the lens (or other part), abrasion resistant, adhere well to the acrylic or methacrylic substrate after repeated usage, provide lubricity for easy release of the casted part, and is preferably UV transparent in the long wave regime (greater than about 280 nm) to be compatible with resin curing processes.

Examples of protective coatings for acrylic or methacrylic pieces include either a thermally cured siloxane-based resin as can be found in U.S. Pat. No. 3,986,997, or a UV cured acrylic or methacrylic resin that has (meth)acrylic functionality of greater than two. Examples of radiation curable coatings are described in Tu et al., U.S. Pat. No. 4,319,811; Chung, U.S. Pat. No. 4,348,462; and Matsuo et al., U.S. Pat. No. 3,968,309. These coatings are normally used to impart abrasion resistance and sometimes anti-fog properties to the final object.

Because of its inherent lubricity and abrasion resistance, siloxane based resins are also useful for release coatings for acrylic. or methacrylic molds. However, possibly because of their high permeability to and solubility of oxygen as well as intrinsic impurities (inhibitors), siloxane resins may interfere with the UV curing of (meth)acrylic systems.

Acrylic and methacrylic pieces may also be coated with inorganic material by a vapor deposition process. For example, SiO and $SiO_2$ coatings are known on acrylic and methacrylic substrates, although vapor deposition is costly in comparison to thermal or radiation-cured organic coatings.

The preferred coatings of the present invention comprise polyacryloylated alkane polyols which contain up to twenty carbon atoms and have at least three O-acryloyloxy groups and have the following formula

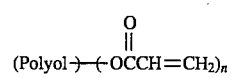

wherein n is greater or equal to four and the "polyol" portion is an alkane polyol having up to about twenty carbon atoms. It will be understood that the polyacryloylated alkane polyols need not be, and typically are not, pure compounds, but rather are provided as a mixture of compounds wherein the alkane polyol has a plurality of alcohol groups, some of which may be acryloylated and some of which may be free hydroxyl groups. Thus, the alkane polyols are described as containing an average number of O-acryloyl groups.

The alkane polyol refers to a polyhydroxy alkane wherein the alkane may be a straight, branched or cyclic alkane containing up to about twenty carbon atoms. Preferably, branched alkane polyols are utilized, such as tetra-(2-hydroxy-ethyl)-methane; 3, 4, 5, 6-tetra-(2-hydroxy-ethyl)-1-hydroxy-heptane, 2-ethyl-2(hydroxymethyl)-1,3-propanediol, and the like.

As used herein it will also be understood that methacrylate can be substituted for an acrylate group and they are viewed as being equivalent to each other within the context of the present invention.

As used herein the term "alkylene oxide" is a divalent group comprising an alkyl chain bonded to an oxygen atom with open valences on the oxygen atom and on one of the carbon atoms in the alkyl chain. Hence, ethylene oxide is —$CH_2$—$CH_2$—O—, propylene oxide is —$CH(CH_3)$—$CH_2$—O—, etc.

Examples of the polyacrylated alkane polyols having up to twenty carbon atoms and at least three acryloloxy groups are Sartomer 9041 (a pentaacrylate ester), Sartomer 295 (a pentaerythritol tetraacrylate), Sartomer 399 (a dipentaerythritol pentaacrylate) and Radcure TMPTA (trimethylolpropane triacrylate).

An alkane polyol containing up to twenty carbon atoms and an average of at least three O-[acryloyl-(polyalkylene oxide)] chains is a compound the following formula

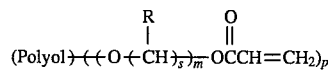

wherein p is greater or equal to three, each m is independently an integer from one to twenty, s is from one to six, and each R is independently H or lower alkyl, preferably methyl. In compositions wherein the polyalkylene oxide chains comprise from four to six alkylene oxide groups, then each m is independently an integer from four to six. Preferably the alkylene oxide groups are ethylene oxide or propylene oxide, i.e. wherein compounds wherein s is two, and both R groups are H or one R group is H and the other R group is methyl. Examples of such compounds include Sartomer 454 (ethoxylated TMPTA), Sartomer 502 (a highly ethoxylated TMPTA), Sartomer 494 (ethoxylated pentaerythritol tetraacrylate) and Sartomer 9035 (a highly alkoxylated triacrylate). An example of a compound wherein the polyalkylene oxide group contains from four to six alkylene oxide groups is Sartomer 499 (ethoxylated TMPTA).

The formulation for the coating will contain a photoinitiating amount of a photoinitiator, usually in a proportion of one tenth to six parts per hundred of resin. Examples of such photoinitiators are Darocure 1173 (2-hydroxy-2-methyl-1-phenylpropan-1-one, Irgacure 184, 907 (2-methyl-1-[4-(methylthio)phenyl]-2-morpholino-propanone-1) or Irgacure 500 (1-hydroxycyclohexylphenyl ketone: benzophenone, 1:1 mixture).

The photoinitiated curing reactions of the coating compositions according to the present invention involve free-radical polymerization and therefore are subject to oxygen inhibition. Therefore, in one embodiment, the composition may be formulated to be cured in the presence of nitrogen or other inert gas or in a vacuum. Alternatively, the composition may be provided as described herein, and initiated with an initiator which counteracts the effects of oxygen on the curing process. Examples of such photoinitiators are Darocure 1173, Irgacure 184, Irgacure 907 or Irgacure 500.

A preferred composition comprises an additional component of from five to thirty parts of an acrylated material which will promote adhesion of the cured material to the substrate such as tetrahydrofurfuryl acrylate (Sartomer 285) or a 1, 6hexane diol diacrylate monomer (such as 1, 6-HDODA Radcure).

In addition, to improve lubricity and releasibility, silicone acrylates may optionally be added to the coating compositions of the present invention. Such additives are not merely physically mixed into the coating composition, but participate in the UV curing reaction of the coating and are incorporated in the final network. The presence of the silicone adds hydrophobicity, chemical resistance, and most importantly, lubricity to the coating material. Because of the (meth)acrylate functionality, the silicones are incorporated into the network thereby preventing their free migration to the surface that is often displayed in silicone coating. Silicone acrylates are discussed in U.S. Pat. No. 4,046,930 to Johnson et al., and U.S. Pat. No. 4,348,454 to Eckberg, the disclosures of which are incorporated by reference herein in their entirety. Acryloxypropyl functional silicones can be purchased from Huls America Inc., (Product #560, 583, 802, 851, 852, 853, 854, 406, 901, 901.5). Silicone acrylates are also available from Radcure (Ebecryl 350, and Ebecryl 1360). Typical concentrations of the silicone acrylates in the final formulation will range between 0.001 to 20%, and preferably between 0.1 to 5% by weight.

Finally, the formulations may contain viscosity modifiers, such as alcohols (typically n-propanol, 2-propanol and/or n-butanol), acrylate esters, or surfactants (such as surfactant FC430, sold by 3M).

The coating compositions according to the present invention may be applied to the plastic mold surfaces using conventional methods such as spin coating, flow coating, dip coating, spray coating and other methods well-known to those of ordinary skill in the ophthalmic lens coating art. A typical spin coating method for lenses is described, for example, in U.S. Pat. No. 5,246,728. The method is also applicable to the coating of mold pieces. A typical coating will have a thickness of one to fifteen microns and it is realized that the thickness applied by spin coating is correlated to the viscosity of the material and the rotational speed of the spinning process.

For dip coating, the coating thickness is related to the viscosity of the material, thus the coating composition is preferably compatible with a variety of viscosity-modifying agents. The coating should impart no color (such as yellowness) to the mold pieces. Using conventional coating techniques the formulation should yield a smooth uniform coating, essential for the molding of high quality lenses.

After application of the coating, it is cured by exposure to heat and/or radiation, such as radiation from a high energy ultraviolet light source, for several seconds. Typical UV radiation sources include an electrodeless tube lamp (made by Fusion Systems) or a medium pressure mercury vapor lamp tube (made by American Ultraviolet Products). The preferred wavelengths for photoinitiation are between 180 and 500 nanometers and the power output of the light source is preferably between about twenty and 500 watts per inch of the source length. The coatings may be cured by placing the mold pieces under a lamp for the desired period of time or by passing them in front of the lamp on a conveyor system. The lamp area may be blanketed with an inert atmosphere such as nitrogen for curing the compositions in the absence of air.

The coated mold obtained by the radiation curing permits complete curing of molded ophthalmic devices, provides good release capability, and adheres strongly to the plastic substrate.

The following examples are provided by way of illustration and are not intended to limit the invention in any way.

EXAMPLES 1–11

General procedure for coating and curing

A coating composition according to the invention was spin coated onto clean three inch polycarbonate disks. The coatings were applied to the articles from a syringe while the article was rotating at 30 RPM. The excess material was spun off during a second cycle where the article was rotated at 3000 RPM for 45 seconds. The coated articles were placed under and American UV products lamp to cure. The lamp is a six inch medium pressure mercury vapor tube lamp and the coated article is placed two inches away from the lamp housing. Articles to be cured in a nitrogen atmosphere are placed in a Teflon container covered with a quartz window. The sealed container is purged with nitrogen and placed under the UV lamp. All coatings were cured for 15 seconds.

Testing of coating adhesion

Coated articles were tested for adhesion of the coating. A crosshatch was scored with a razor through the coating. Scotch tape was applied to the surface covering the crosshatch. The tape was quickly peeled off with one swift motion. This was repeated three times. If no coating was removed by the test the adhesion was deemed to be acceptable. All coatings tested showed good adhesion.

Conditions and adhesion results of experiments conducted for 11 different coating formulations are tabulated below (Example 1–11):

TABLE 1

| Example # | 1 | 2 | 3 | 4 | 5 | 6 | 7 | 8 | 9 | 10 | 11 |
| --- | --- | --- | --- | --- | --- | --- | --- | --- | --- | --- | --- |
| I Pentaacrylate ester (Sartomer 9041) | 30 | 30 | 30 | 40 | 30 | 20 | 30 | 20 | 30 | 35 | 45 |
| II Ethoxylated TMPTA (Sartomer 499) | 50 | 30 | | | | 20 | | 20 | | | |
| II Ethoxylated Pentaerythritol tetraacrylate (Sartomer 494) | 10 | 30 | 30 | | 30 | | | | | | |
| II Highly ethoxylated TMPTA (Sartomer 502) | | | | 30 | 60 | 30 | 60 | 60 | 60 | 70 | 65 |
| III Tetrahydrofurfuryl acrylate (Sartomer 285) | 10 | 10 | 10 | | 10 | | 10 | | | | |

TABLE 1-continued

| Example # | 1 | 2 | 3 | 4 | 5 | 6 | 7 | 8 | 9 | 10 | 11 |
|---|---|---|---|---|---|---|---|---|---|---|---|
| II High M.W. Ethoylated TMPTA Photomer 4158 (Henkel) | | | | | | | | | | | 55 |
| i Irgacure 500 (Ciba Geigy) | 5 | 5 | 5 | 5 | | 5 | 5 | | | | 1 |
| i Irgacure 907 (Ciba Geigy) | | | | | 5 | | | | | | |
| i Darocure 1173 (Ciba Geigy) | | | | | | | | 5 | 5 | 5 | |
| s FC-430 | | | 0.25 | | 0.25 | | | | | | |
| Curing Time (seconds) | 15 | 15 | 15 | 15 | 15 | 15 | 15 | 15 | 15 | 15 | 15 |
| Curing atmosphere | air | air | air | air | air | air | air | nitrogen | nitrogen | nitrogen | nitrogen |
| Steel Wool Test | 0.6 | 0.5 | 0.4 | 0.3 | 0.3 | 1.1 | 0.8–1.0 | 0.6–0.8 | 0.3–0.6 | <0.3 | 0 |
| Adhesion Test | Good | Good | Good | Good | Good | Good | Good | Good | Good | Good | |
| Bayer Test | 1.3–1.4 | 1.4–1.5 | 1.2–1.3 | | | | | | | | |

I = O-acryloyl alkane polyol
II = O-[acryloyl-(polyalkylene oxide)] alkane polyol
III = Adhesion promoter
i = photoinitiator
s = surfactant

EXAMPLE 12

Experiments were performed using a combination of one glass mold and one PMMA mold with a siloxane based coating. A (meth)acrylic based liquid resin was prepared and cured between the molds using a mercury vapor lamp. The casted surface immediately adjacent to the plastic coated mold was uncured, while the casted surface adjacent to the glass mold was completely cured.

The UV light source for the experiments was radiated through the glass piece and the plastic pieces. Several industrial coatings were tested including S-30 from Exxene, and Dow Corning 20 release coating. Pure polyvinylmethyl siloxane coated glass surfaces were also found to inhibit cure. While the status of incomplete surface cure can be quite subtle, it can cause surface aberrations in optical quality and poor abrasion resistance of the lenses cast.

What is claimed is:

1. A mold for forming ophthamlic devices comprising one or more plastic pieces defining a shape of the device to be molded and a coating, wherein said coating, comprises:

I: ten to fifty parts of polyacryloylated alkane polyols, said alkane polyols containing up to about twenty carbon atoms and an average of at least three O-acryloyl groups; and II: twenty to eighty parts of alkane polyols, said alkane polyols containing up to about twenty carbon atoms and an average of at least three O-(acryloyl-(polyalkylene oxide)) chains; wherein each of said polyalkylene oxide chains comprise from one to twenty alkylene oxide groups.

2. A mold according to claim 1 wherein said coating comprises:

I: twenty to forty parts of said polyacryloylated alkane polyols;

II: fifty to eighty parts of said alkane polyols; and

III: optionally, five to thirty parts of an acrylated material which promotes adhesion of the cured coating composition to said substrate.

3. A mold according to claim 1 or 2, wherein said coating further comprises:

one tenth to twenty parts of silicone acrylate.

4. A method of forming a plastic mold for ophthalmic devices, comprising the step of:

coating a mold having casting faces comprising polyacylate or polymethacrylate; with a radiation curable composition comprising:

ten to fifty parts of polyacryloylated alkane polyols, said alkane polyols containing up to about twenty carbon atoms and an average of at least three O-acryloyl groups;

twenty to eighty parts of alkane polyols, said alkane polyols containing up to about twenty carbon atoms and an average of at least three O-(acryloyl-(polyalkylene oxide) chains; wherein each of said polyalkylene oxide chains comprise from one to twenty alkylene oxide groups; and a photoinitiating amount of a photoinitiator; and exposing said coating to ultraviolet radiation sufficient to activate said photoinitiator and polymerize said composition.

5. A method according to claim 4, wherein said coating composition comprises:

twenty to forty parts of said polyacryloylated alkane polyols;

fifty to eighty parts of said alkane polyols; and optionally, five to thirty parts of an acrylated material which promotes adhesion of the cured coating composition to said substrate; and a photoinitiating amount of photoinitiator.

6. A method according to claim 4 or 5, wherein said coating further comprises:

one tenth to twenty parts of silicone acrylate.

* * * * *